United States Patent [19] [11] 3,858,177
Kugelmann et al. [45] Dec. 31, 1974

[54] VEHICLE BLINK PULSE GENERATOR MANUFACTURABLE ON AN INTEGRATED CIRCUIT BASIS

[75] Inventors: Adolf Kugelmann, Leonberg; Gerhard Conzelmann, Leinfelden; Ewald Henninger, Friolzheim; Dieter Meyer, Feucht; Hartmut Seiler, Reutlingen, all of Germany

[73] Assignee: Robert Bosch GmbH, Stuttgart, Germany

[22] Filed: June 13, 1973

[21] Appl. No.: 369,583

[30] Foreign Application Priority Data

July 24, 1972 Germany............................ 2236210

[52] U.S. Cl....................... 340/73, 315/77, 328/196, 340/81 R

[51] Int. Cl............................................... B60g 1/38

[58] Field of Search............ 340/73, 76, 81 R; 81 F; 315/77, 82, 83; 328/190, 193, 196, 208

[56] References Cited

UNITED STATES PATENTS

| | | | |
|---|---|---|---|
| 2,386,120 | 10/1945 | James | 340/76 |
| 3,735,196 | 5/1973 | Bolinger et al. | 340/81 R |
| 3,768,085 | 10/1973 | Gebhardt et al. | 340/81 R |

*Primary Examiner*—Donald J. Yusko
*Assistant Examiner*—Marshall M. Curtis
*Attorney, Agent, or Firm*—Flynn & Frishauf

[57] ABSTRACT

An emitter-coupled differential amplifier has its inputs connected to the extremities of the diagonal of a bridge comprising resistors and a capacitor, while its output controls a Darlington circuit switch which when operated practically short-circuits the other diagonal of the bridge and causes the capacitor to charge and discharge between two limiting potentials and to make the differential amplifier operate as an astable multivibrator. The Darlington switch also controls the blinker relay. A stabilizing switching circuit controlled by the current flow through a series resistor in the lamp circuit is arranged normally to short-circuit, during the flash period of the lamps, one element of a voltage divider to which the bridge capacitor is connected so as to lengthen the multivibrator period, but if one lamp in the circuit has failed, this switching circuit will not operate, the voltage divider will not be short-circuited and the flash frequency will be increased, warning the driver of the vehicle by the usual pilot light. The circuit is designed for utilization of integrated circuit techniques.

24 Claims, 2 Drawing Figures

PATENTED DEC 3 1 1974

3,858,177

VEHICLE BLINK PULSE GENERATOR MANUFACTURABLE ON AN INTEGRATED CIRCUIT BASIS

This invention relates to blink pulse generators suitable for directional lights of a motor vehicle and, in particular, to blink pulse generators capable of producing blink pulses at distinctly different frequencies. Still more particularly, the invention concerns such blink pulse generators in which the blink frequency depends upon conditions which it is desired to distinguish thereby, and in which the duration of the two alternating states of an astable multivibrator is determined by the charging and discharging of a capacitor between two limit voltages.

Blink pulse generators are known in which an emitter-coupled astable multivibrator is provided to generate the blink signals, and in which the repetition rate of the multivibrator varies in accordance with the number of blink lamps, as the result of the consequent shift of the collector potential of a transistor. This type of circuit works well enough, but a large number of the electrical components of such a circuit are not suited for manufacture by monolithic integrated circuit techniques.

It is an object of the invention to provide a blink pulse generator of which the repetition rate, that is, the blink frequency, may be changed in dependence upon the function of the blink lamps. The design of the circuit should take particular account of the desirability that as many as possible of the components should be capable of manufacture by monolithic integrated circuit techniques. In addition, it is an object of the invention that the blink pulse generator should be able to operate, so far as possible, without interference from disturbing voltages such as are frequent during operation of a motor vehicle. Finally, the blink pulse generator should be simple in construction as well as efficient and economical.

SUBJECT MATTER OF THE PRESENT INVENTION

Briefly, a blink pulse generator is provided with an astable multi-vibrator interconnected with a bridge circuit comprising resistors and a capacitor, the latter charging and discharging during operation between two limit potentials, at least one of which may be changed at at least one of the terminals of a bridge diagonal to which the amplifying element of the astable multivibrator is connected. Change of a limit potential is accomplished by means of at least one control switch, which may be a semiconductor switch, that is operated in dependence upon an electrical signal related to operation of the blink lamps. The operation of such a switch may thus depend upon whether one of the blink lamps of a vehicle has burned out or is missing. The circuit includes a variety of provisions to mitigate or forestall various possible malfunctions and to assure stable operation over a wide range of operating conditions.

Figure 1:
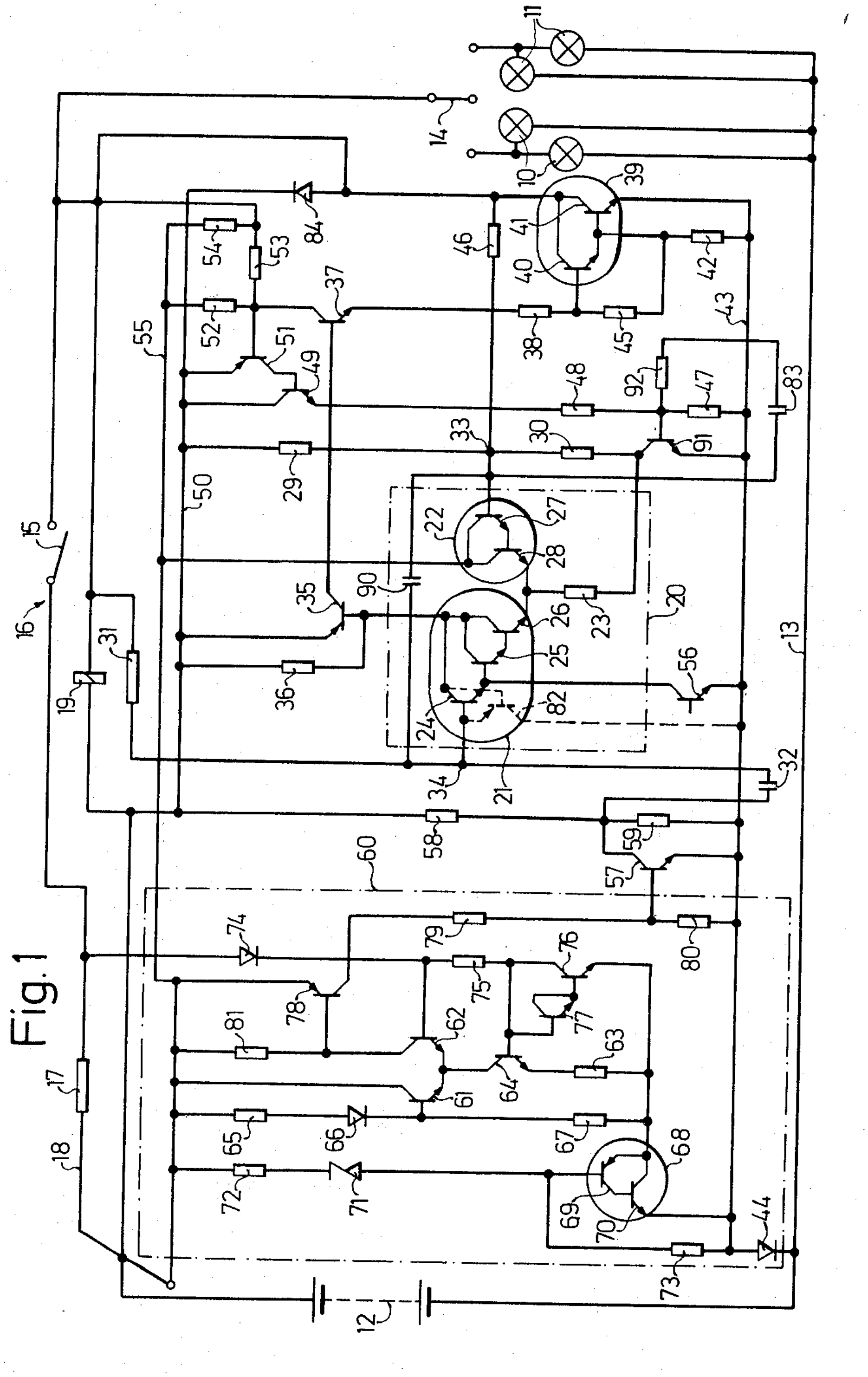
Figure 2:
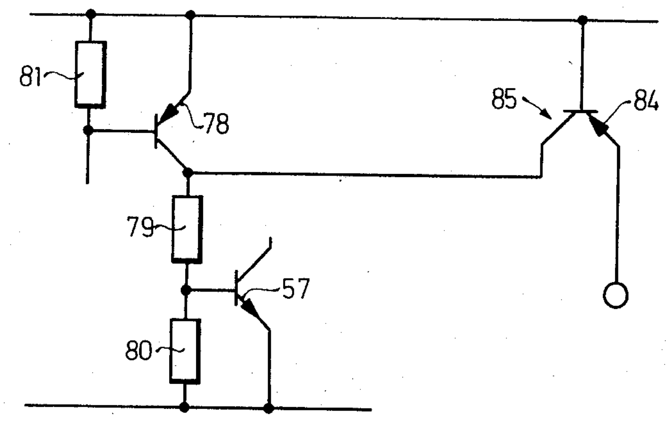

The invention will be described by way of example with reference to the accompanying drawings, wherein:

FIG. 1 is a circuit diagram of a blink pulse generator with an associated circuit for providing a switching signal in dependence upon the operation of the blink lamps, in accordance with the invention; and FIG. 2 is a circuit diagram of a switching element for modifying the operation of a portion of the blink pulse generator shown in FIG. 1.

FIG. 1 is a circuit diagram of a blink pulse generator for the directional lights of a motor vehicle. The blinking action is controlled by the operation of an astable multivibrator. Two pairs of directional lamps of the motor vehicle are shown at 10 and 11 respectively. One terminal of each of these lamps is connected to the negative supply bus 13 that leads to the negative terminal of an operating voltage source 12. The other terminals of each pair of lamps is connected to a fixed terminal of the directional indicating switch 14. This switch 14 is arranged in the usual way for directional light control, with a neutral central position and with positions on either side in which the arm of the switch connects either the directional lights 10, which may for example be on the left side of the motor vehicle, or the directional lights 11, on the right side, into the circuit. The arm of the switch 14 is connected to the positive terminal of the operating voltage source 12 through the contactor element 15 of a blink relay 16 and also through a regulating resistor 17. The latter is connected to the positive battery by the connection 18. The contactor 15 is actuated in accordance with current through the exciting winding 19 of the blink relay 16. The relay winding 19 is switched on and off in step with the transitions of the multivibrator of the blink pulse generator.

The astable multivibrator of the blink pulse generator comprises a differential amplifier 20 composed of two amplifier units 21 and 22 having a common emitter resistor 23. The amplifier unit 21 consists of three transistors 24, 25, 26 connected together in a Darlington circuit, with the emitter of transistor 24 connected to the base of transistor 25 and the emitter of transistor 25 with the base of transistor 26. The collectors of all three transistors are connected in parallel. The amplifying unit 22 is also a Darlington circuit, composd of two transistors 27 and 28. The emitter of transistor 27 is connected to the base of transistor 28, and the collectors of the transistors 27 and 28 are connected together. The common emitter resistor 23 is connected to the emitters of transistors 26 and 28, which respectively belong to the amplifying units 21 and 22.

The two inputs of the differential amplifier 20 are connected to a diagonal of a bridge circuit composed of resistors 29, 30 and 31 and a capacitor 32. A first terminal 33 of this bridge diagonal is formed by the junction of resistors 29 and 30, and a second terminal 34 of this diagonal is formed by the common connection of resistor 31 and capacitor 32.

The base of a coupling transistor 35 is connected with the output terminal of the differential amplifier, that is, with the common connection of the collectors of the transistors 24, 25 and 26. The emitter of the coupling transistor 35 is connected to the positive terminal of the operating voltage source 12, and a resistor 36 is connected between the base and emitter of the coupling transistor 35. The collector of the coupling transistor 35 is connected to the base of a transistor 37, the emitter of which is connected over a resistor 38 with the input of a switching stage 39, which is composed of a Darlington-connected pair of transistors 40 and 41. The emitter of transistor 40 is connected to the base of transistor 41 and the collectors of these two transistors are connected together and operated in parallel. The emitter of transistor 40 and the base of transistor 41 are connected over a resistor 42 to a supply bus 43, which is connected to the negative terminal of the operating voltage source 12 over a diode 44 which serves as protection against reverse polarization of the battery connection. The emitter of transistor 40 and the base of transistor 41 are also connected over a resistor 45 with the base of transistor 40. A resistor 46 is connected to the collectors of transistors 40 and 41 of the switching stage 39. The resistor 46 is connected at its other end with the first terminal 33 of the bridge diagonal to which the differential amplifier 20 is connected.

For the explanation of the operation of the astable multivibrator, the circuit of which has just been described, it should first be assumed that one electrode of capacitor 32 and also the lower terminal of the common emitter-resistor 23 are connected directly to the supply bus 43. It should further be assumed that capacitor 32 is discharged. With capacitor 32 discharged, a negative potential appears at the first terminal 34 of the bridge diagonal, which blocks the Darlington combination of transistors 24, 25 and 26. With the transistors 24, 25 and 26 blocked, a positive potential appears at the base of coupling transistor 35, that likewise blocks this coupling transistor 35, as well as the transistor 37 which is controlled by it. With transistor 37 blocked, the switching stage composed of transistors 40 and 41 is also blocked and the connection point of resistor 46 with the collectors of transistors 40 and 41 is at a positive potential. In consequence, the resistor 46 is effectively connected in parallel to the bridge resistor 29, so that an upper limiting or threshold potential appears at the first terminal 33 of the bridge diagonal.

It is assumed that the relay winding 19 is of low resistance in comparison with resistor 46. The capacitor 32 now charges over the resistor 31 and the relay winding 19, towards positive potential. When the upper limit potential present at the first terminal 33 of the bridge diagonal is reached at the second terminal 34 of the bridge diagonal, the amplifying unit 21 begins to draw current which puts the coupling transistor 35, and with it the associated transistor 37, into conducting condition. When transistor 37 conducts, the switching stage 39 is also made conducting, so that at the connection of the collectors of transistors 40 and 41 with the resistor 46 substantially the potential of the supply bus 43 appears. When negative potential thus appears at the connection of the switching stage 39 with the resistor 46, the resistor 46 is effectively connected in parallel to the bridge resistor 30, so that a lower limit or threshold potential appears at the first terminal 33 of the bridge diagonal. As the result of this lower limit potential at the terminal 33 of the bridge diagonal, the amplifier unit 22 is fully blocked. As the result of the cross coupling, the entire current is then taken over by the first amplifying unit 21. The capacitor 32 will now again discharge, because with the switching stage 39 conducting, the bridge resistor 31 is likewise connected to the negative supply bus 43 over the collector-emitter path of the transistor 41. The capacitor 32 will then discharge to a potential that corresponds to the lower limit potential at the first terminal 33 of the bridge diagonal. When this potential is reached, the amplifying unit 22 again begins to conduct and the amplifying unit 21, containing transistors 24, 25 and 26, is blocked, so that the sequence of operations just described can begin anew.

In the course of the flipflop operation of the astable multivibrator just described, whenever the switching stage 39 conducts, the operating winding 19 of the blink relay 16 is connected to the supply bus 43. A current can then flow through the operating winding 19, which will close the contactor 15 of the blink relay 16. A current then flows over the connection 18, the control resistance 17, the closed contactor 15, the directonal switch 14 and one of the directional light pairs 10 or 11, to the supply bus 13 which is connected to the negative terminal of the operating voltage supply 12. According to the position of the directional switch 14, the left or the right pair of directional lights will then flash on and off.

A switching transistor 91 is connected to the astable multivibrator with its collector connected to the common emitter resistor 23 of the differential amplifier 20 and with its emitter connected to the supply bus 43. The base of switching transistor 91 is connected to the tap of a voltage divider composed of resistors 47 and 48. This voltage divider is connected between the supply bus 43, to which resistor 47 connects and the emitter of transistor 49, to which the resistor 48 connects. The collector of the transistor 49 is connected to the supply bus 50 and the base of transistor 49 is connected to the collector of a transistor 51, of which the emitter is connected to the supply bus 50. The base of transistor 51 is connected to the junction of two resistors 52 and 53, to the other ends of which the terminals of a resistor 54 is connected. The junction of resistors 52 and 54 is connected to a supply bus 55, whereas the connection of resistors 53 and 54 is connected with the output of the switching stage 39, that is, with the collectors of the transistors 40 and 41.

The previously described branch circuit involving the switching transistor 91 and the transistors 49 and 51 serves to establish a connection between the astable multivibrator and the supply busses only when the directional switch 14 is placed into one of its two active positions, even though the operating voltage is connected to the blink pulse generator circuit. The multivibrator then operates only if the blinker lights 10 or 11 are to be put in operation, The activation of the astable multivibrator occurs in the following manner. If the directional switch 14 is in its middle position, that is, when no flashing signals are to be produced, the base of the transsstor 51 is connected to the supply bus 55 directly over resistor 52 and in parallel to that resistor over the series connection of resistors 53 and 54. The supply bus 55 is connected to the positive terminal of the operating voltage source 12. While the base of the transistor 51 is connected as just mentioned to positive battery over resistors 52, 53 and 54, the emitter of that transistor is connected directly to positive battery over the supply bus 50. In consequence, the transistor 51 is blocked. With the transistor 51 blocked, the transistor 49 is likewise blocked and the switching transistor 91 likewise conducts no current. A positive potential therefore appears at the collector of the switching transistors 91, which drives the emitter potential of the transistors 26 and 28 so far positive that neither of the amplifying units 21 and 22 conduct any current, with the consequence that the astable multivibrator is switched off.

If now the directional switch is actuated so that one of the lamp pairs 10 or 11 is connected with the arm of the switch 14, a current can then flow over the emitter-base path of the transistor 51, the resistor 53, the directional switch 14 and one of the directional light pairs 10 or 11, from the positive to the negative terminals of the operating voltage source 12. The transistors 51 and 49 and the switching transistor 91 are then put into their conducting condition and the emitter resistor 23 of the differential amplifier is effectively connected with the supply bus 43. With these connections established, the astable multivibrator begins to oscillate.

The collector of the transistor 37 is connected to the base of the transistor 51 which, as just described, operates to switch in the astable multibibrator. When current flows through the transistors 24, 25 and 26 of the first amplifier unit and also through the coupling transistor 35 and its control transistor 37, a current then also flows through the base-emitter path of the transistor 51 to the collector of the transistor 21. This is particularly important, because immediately after the beginning of current flow through the transistors 40 and 41 of the switching stage 39, the contactor 15 of the blink relay 16 closes. The potential at the junction of the resistors 53 and 54 then rises almost to the positive supply voltage, and the transistor 51 would immediately block except for the current supplied by the transistor 37. If the transistor 51 should block in this situation, the transistors 49 and 91 would also block and the astable multivibrator would be put out of action. That is prevented, however, by the current flow from the transistor 37 to the transistor 51.

As may be gathered from the foregoing, the differential amplifier 20 is not continuously switched on by the directional switch 14, because the contactor 15 of the blink relay 16 has a delayed opening on account of magnetic and mechanical inertia, with the result that during this short delay phase a positive signal can again be given to the junction of the resistors 53 and 54, to block the transistor 51, because the transistor 37 is blocked and hence likewise the switching stage 39. In this brief moment, however, it is not important that the differential amplifier 20 is switched on, because during this phase the switching stage 39 is not intended to be operated and only the recharging of the capacitor 32 over the resistor 31 takes place.

At the point of connection of the emitter of transistor 24 and the bse of transistor 25 in the amplifier unit 21, a leak resistor 56 is connected with its other terminal connected to the supply bus 43. In the embodiment of the invention shown in FIG. 1 this leak resistor 56 is provided in the form of a transistor with an open base connection. The leak resistor 56 is necessary to draw off residual currents, because the input signal to the second terminal 34 of the bridge diagonal is relatively weak, so that the residual currents, which are of the same order of magnitude as the input signal, could lead to disturbances in the circuit.

The repetition frequency of the astable multivibrator, as already indicated in the introduction, is to be changed in accordance with the operation of the flashing lights 10 or 11. The electric current supply for the lamps 10 and 11 passes from the positive terminal of the operating voltage source 12 over the control resistor 17 and the contactor 15 of the blink relay 16. If now one of the blinker lights 10 or 11 fails, the voltage drop across the control resistor 17 changes. This change in voltage drop is utilized to actuate a switch which in the circuit here shown is the switching transistor 57, which has its output electrode on the tap junction of the voltage divider 58, 59. That terminal of the capacitor 32 which is not connected to the second terminal 34 of the bridge diagonal is connected to the same tap of the voltage divider 58, 59. If the switching transistor 57 is blocked, the connection to the capacitor 32 is held at the voltage divider potential determined by the resistors 58 and 59. If the transistor 57 is conducting, however, the capacitor 32 is then connected to the supply bus 43 which leads to the negative terminal of the voltage source 12, this connection being effected through the collector-emitter path of the transistor 57.

when the potential of the electrode of capacitor 32 which is connected to the tap of the voltage divider formed by the resistors 58 and 59 is pullsed down towards negative battery potential by the sudden shift of the potential of theh voltage divider, the potential of the other electrode of the capacitor 32, which is connected with the second terminal of the bridge diagonal is also changed. As the result of this potential shift at the input of the differential amplifier 20, the time period for the recharging of the capacitor 32 is changed, as the result of which the flipflop frequency of the astable multivibrator is also changed. In consequence of this frequency change, the one still operating flashing light of the pair 10 or the pair 11, as the case may be, flashes at another frequency, so that the corresponding pilot light provided on the dashboard of the vehicle (not shown) also blinks at the new frequency. This change of the blink frequency informs the driver of the motor vehicle that one of the flashing lights of the directional pair 10 or 11 is out of operation. In the circuit here described the switching transistor 57 is normally blocked, that is, it is blocked while both lights of a directional pair are shining. Consequently, in this arrangement the capacitor 32 can be recharged by a voltage across the bridge diagonal 34 which has been raised by the voltage change at the collector of the transistor 57. If a lamp of one of the pairs 10 and 11 fails, then when that pair is caused to flash, the switching transistor 57 will conduct and the capacitor will be held steadily at the potential of the supply bus 43, that is, it will he held there during both the light and dark phases. In consequence, the potential to which the capacitor 32 is recharged will not be raised by the transistor 57, so that the charging period of the capacitor 32 will be shortened. The blink frequency of the still functioning lamp of the directional pair 10 or 11 will therefore be raised, and the corresponding dashboard pilot lamp (not shown) of the motor vehicle will likewise blink more rapidly.

In order to derive a switching signal for the switching transistor 57 from the voltage drop across the control resistor 17, a switching circuit 60 is provided. This switching circuit 60 includes a differential amplifier provided with transistors 61 and 62. A common emitter resistor 63 is connected in series with a transistor 64 that serves to supply the differential amplifier with a constant current, in order to avoid having the switching range of the transistors 61 and 62 depend upon voltage and in order to improve temperature stability. A voltage divider consisting of a resistor 65, a diode 66 and a resistor 67 is connected to the base of the transistor 61 in such a way that the base of transistor 61 is connected to the junction of diode 66 and resistor 67. The voltage divider as a whole is connected between the supply bus 55, where the resistor 65 is connected, and an impedance converter stage 68, to which the resistor 67 is connected. The impedance conversion stage 68 provides a connection between the voltage divider 65, 66, 67 and the supply bus 43 and operates as a constant current source. This constant current source 68 comprises transistors 69 and 70, which are interconnected so that the collector of transistor 69 is connected to the base of transistor 70 and the collector of transistor 70 is connected to the emitter of transistor 69. The emitter of transistor 70 is connected to the supply bus 43. The base of the transistor 69 of the impedance conversion stage 68 is connected over a series combination of a Zener diode 71 and a resistor 72 to the supply bus 55. The resistor 72 serves to compensate for the voltage dependence of the lamps 10 and 11. The Zener diode 71 similarly serves to oppose a voltage dependent shift of the switching range of the differential amplifier by virtue of the fact that the differential potential between the supply bus 55 and the emitter of the transistor 69, which serves as the operating voltage for the switching amplifier, is stabilized by this Zener diode 71. As the result of the provision of the impedance conversion stage 68, the power dissipation in the resistor 72, the Zener diode 71 and the resistor 73, which is essentially determined by the current flowing through these components, does not become so great as to lead to excessively high crystal temperatures and hence damage to the circuit in the case of structures of the monolithic integrated circuit type, because of the high heat flow concentration that would arise in such a case.

A diode 74 is connected between the base of the transistor 62 and the control resistor 17. A resistor 75 is also connected to the base of the transistor 62, which provides a path to the constant current source 68 through itself and then over the collector to emitter path of the transistor 76. This path is connected to the constant current source 68 at the connection which is common to the collector of transistor 70 and the emitter of transistor 69. The base of the transistor 76 is connected to both the collector and the emitter of a transistor 77, of which the base is in turn connected to the base of transistor 64, which is also connected to the junction of the resistor 75 and the collector of the transistor 76.

The collector of the transistor 62 is connected to the base of a coupling transistor 78, of which the emitter is connected to the supply bus 55, while its collector is connected to the series combination of resistors 79 and 80, through which a connection is made to the supply bus 43. The two resistors 79 and 80 form a voltage divider to the tap of which is connected the base of the switching transistor 57. There is a connection to the supply bus 55 from the collector of the transistor 62 over a load resistor 81. The transistors 76 and 77 are provided in order to obtain particularly good temperature stability. The response characteristic of the transistor 77 should correspond to that of the transistor 78, and the response characteristic of the transistor 76 should correspond to that of the transistor 64.

The circuit 60 operates as follows. The design of the circuit is so dimensioned that for the case in which two indicator lights 10 are operating, the voltage drop at the control resistor 17 is greater than that across the resistor 65 provided at the input of the transistor 61 and connected to the base of that transistor through the diode 66. The collector current of the transistor 62 is therefore smaller than that of the transistor 61. The transistor 78 and the switching transistor 57 are therefore blocked. If, however, only one indicator light 10 should be operating, which means therefore that one of the two indicator lights has failed, the voltage drop across the control resistor 17 is smaller than that across the resistor 65. The current through the transistor 62 is then greater than that through the transistor 61. Accordingly, the transistor 78 conducts, and the switching transistor 57 likewise conducts. Because the switching transistor 57, in the case of failure of one indicator light 10, remains conducting during both the dark and light phases of the intermittent flashing of the remaining light, the blink frequency of the remaining light is raised, because the capacitor 32 no longer has applied to it the tap potential of the voltage divider 58, 59, so that the charging back and forth of this condenser now takes place only between the normal upper and lower limit potentials. On the other hand, if both flashing lights 10 are operating, so that the switching transistor 57 is blocked during the bright phase of the blink cycle, the tap potential of the voltage divider 58, 59 is applied to the capacitor 32, with the effect that the potential at the terminal 34 of the bridge diagonal is also raised. The capacitor 32 then discharges from a higher potential down to the lower limit potential, so that in a normal case, that is, when both flashing lights are operating, the blink frequency is lower. Faster blinking of the flashing lights 10 and hence faster blinking of a pilot light (not shown) provided on the dashboard of the motor vehicle, therefore indicates, as already mentioned, the failure of a blinker lamp.

The blink pulse generator starts operating after the actuation of the directional switch 14 and does so by immediately lighting the directional light 10 or 11 according to which pair is selected. In other words, the blink pulse generator begins with an on-period of the blinker lights 10 or 11. The first on-period of the pair of directional lights 10 or 11 following the actuation of the directional switch 14 would be substantially longer than the succeeding on periods since the capacitor 32 is always connected to the tap potential of the voltage divider 58, 59 through the switching transistor 57 during the dark phase of the blinker lights 10 or 11. If the capacitor 32 is charged to the positive supply voltage before the beginning of the first on period of the lights, the potential of the left-hand electrode of the capacitor 32, which corresponds to that of the negative terminal of the voltage source 12, would be raised by the potential set by the voltage divider 58, 59 when the switching transistor 57 is switched off. This sudden rise of the potential of the left-hand electrode of the capacitor causes a potential jump to take place also at the right-hand electrode of the capacitor and hence at the first terminal 34 of the bridge diagonal. This jump raises the potential to a value higher than that of the voltage source, when the capacitor 32 is charged to the full supply potential. The capacitor 32 wouldl thereafter discharge from a higher voltage, so that the time required for it to reach the lower limit potential would be substantially longer than if the capacitor were discharging only from the substantially lower value of the upper limit potential, which is established by the parallel connection of the resistor 46 and the bridge resistor 29 plus the potential jump applied by the voltage divider 58, 59.

In order to avoid the lengthening of the first "on" pulse of the directional light pair 10 or 11, a transistor 82 is provided with its emitter connected to the base of the transistor 24 and hence also to the second terminal 34 of the bridge diagonal. The collector of the transistor 82 is connected to the supply bus 43, while its base is connected to the collector of the transistor 24. The transistor 82 and its connections are shown in FIG. 1 in dashed lines.

If now at the beginning of the first on period of the directional lamps 10 or 11 the potential of the second bridge terminal 34 is higher than the operating battery voltage, the transistor 82 will conduct and rapidly discharge the capacitor 32 to the point at which the right-hand electrode of the capacitor has no more than the potential of the supply voltage. The flashing operation then proceeds as described, and the first on period is about the same as the following on-periods of the directional lights 10 or 11. Since the circuit assembly described is to be constructed as an integrated circuit, it is convenient to provide the transistor 82 as a parasitic substrate transistor associated with the transistor 24 of the differential amplifier 20. This is the significance of the dashed line representation in FIG. 1.

For protection of the circuit against disturbing potentials and against voltage peaks that may arise, for example, upon switching of the blink relay 16, various precautions have been embodied in the circuit. Thus, a capacitor 83 is connected with the first terminal 33 of the bridge diagonal, which leads over a low value resistor 92 to the base of the switching transistor 91. This capacitor influences the cross-coupling of the multivibrator so as to suppress disturbing voltages which could be induced particularly in the exposed connections between the contacts 15 of the blink relay 16 and the directional switch 14. When the blink pulse generator is operating, the switching transistor 91 is accordingly conducting, so that its base-emitter path has very low resistance, with the consequence that the capacitor 83 functions as if it were connected directly to ground or negative battery at its right-hand electrode.

A further possibility for protection against disturbance is presented by the possibility of utilizing the parallel current of behavior differential amplifiers. For this purpose a capacitor 90 is connected between the terminals 33 and 34 of the bridge diagonal. If a disturbing signal, for example, is present at the terminal 33, the capacitor 90 applies it also to the terminal 34 so that both terminals are pulled the same way by the disturbance. In this way the generation of switching operations by disturbances is prevented.

The operating winding 19 of the blink relay 16 is bridged by a diode 84. When the switching stage 39 switches off, the diode 84 provides a path for the current flowing as the result of the inductance of the operating winding 19. This relatively high current now flows from the operating winding 19 over the diode 84 and over the supply bus 50 back to the operating winding 19 of the blink relay 16. While this happens, voltage drops up to about 100 millivolts appear in the connecting wires. If the positive operating voltge were connected only by one path with the switching unit 60, this voltage drop would be detected by the circuit designed to detect the voltage drop in the control resistor 17 and could switch the switching transistor 57. In order to prevent that, a separate connection path 55 is provided from the positive terminal of the voltage supply to the switching unit 60. The remainder of the pulse generator circuit, particularly the differential amplifier 20 and the stages controlled by it, are connected to the positive terminal of the operating voltage source by means of the supply bus 50.

If it should be desired to avoid providing two separate conductors 50 and 55 for supplying current to the circuit, a modification of the circuit in accordance with FIG. 2 may be used. The design of this circuit proceeds from the basis that the circuit unit 60 must be protected against disturbance during the period in which current is flowing through the diode 84. For this purpose the diode 84 can be replaced by the base-emitter path of the transistor 85, the collector of which is connected with the collector of the transistor 78, If a current then flows over what is effectively the diode 84, that is, through the base-emitter path of the transistor 85, a current also flows over the collector-emitter path of this transistor 85 which affects the switching condition of the transistor 78 of the circuit unit 60 in the sense necessary for protection of the circuit unit 60.

Although the invention has been described with respect to particular embodiments, it will be understood that variations and modifications may be made within the inventive concept without departing from the spirit of the invention. For example, if in parallel with the selector switch 16 another switch (not shown) for activating the directional lights is provided for use when events cause the vehicle to be stopped in a dangerous place, when such a switch is actuated the circuit will operate as described to flash all the blinker lights.

We claim:

1. A blink pulse generator suitable for directional lights of a motor vehicle and producible largely with integrated circuit units comprising, in combination with a voltge source (12), a selector switch (14) and a plurality of directional lights (10 or 11) for connection in circuit in each active position of said selector switch:

an amplifier (20) connected with its input across the diagonal of a bridge circuit composed of resistors and a capacitor (32) and with its output connected with a first switching means (39) for causing said amplifier to operate as an astable multivibrator by causing said capacitor (32) to charge and discharge between two limit potentials provided at at least one extremity of said bridge diagonal, the output of said first switching means (39) being connected for that purpose to a resistor (46) connected at its other end to an extremity (33) of said diagonal of said bridge, said output of said first switching means (39) being also connected to operate a second switching means (15, 16) for flashing the directional lights connected in circuit by said selector switch (14), and means including a third switching means (57) for modifying the frequency of said operation of said amplifier (20) as an astable multivibrator by change of at least one of said limit potentials at at least one extremity of said diagonal of said bridge, said third switching means (57) being controlled by an electrical signal indicating the condition of said directional lights.

2. A blink pulse generator as defined in claim 1 in which said third switching means (57) is a switching transistor (57) arranged to be switched in dependence upon the magnitude of the current switched by said second switching means as detected by the voltage drop in a control resistor (17) interposed between the contacts of said second switching means and said voltage source and in which said capacitor (32) has its terminal, which is not connected to an extremity (34) of said bridge diagonal, connected to a voltage divider (58, 59) which is so connected to said third switching means (57) that its voltage division ratio is changed by operation of said third switching means (57).

3. A blink pulse generator as defined in claim 2 in which said amplifier is a differential amplifier with at least two transistors and a common emitter resistance (23), in which a second switching transistor (91) controlled by the position of said selector switch (14) is provided for switching off said amplifier (20) while the operating voltage of said source remains applied to said blink pulse generator, and in which the switching path of said second switching transistor (91) is connected between said common emitter resistance (23) and a supply bus that is connected with a terminal of said voltage source.

4. A blink pulse generator as defined in claim 1 in which a fourth switching means (82) is connected to said capacitor (32) at its connection (34) with said bridge diagonal for discharging said capacitor to the extent its charge tends to exceed the potential of said voltage source.

5. A blink pulse generator as defined in claim 4 in which a fourth switching means (82) is provided as part of a monolithic integrated circuit and is, further, provided as a parasitic substrate transistor associated with one of the transistors (24) of said amplifier (20), said amplifier being constituted as an emitter-coupled differential amplifier.

6. A blink pulse generator as defined in claim 3 in which the output of said differential amplifier (20) is connected so as to control a coupling transistor (35) the output electrode of which controls, over an additional transistor (37), said first switching means (39) which is in the form of a Darlington multitransistor circuit, and in which the switched path of said first switching means is connected in circuit with the operating winding (19) of a blink relay (16) which operates a contactor (15) in the circuit of said directional lights (10 or 11).

7. A blink pulse generator as defined in claim 6 in which said additional transistor (37) is connected with a switching circuit (49, 51) acting on said second switching transistor (91).

8. A blink pulse generator suitable for directional lights of a motor vehicle comprising, in combination with a voltage source (12):

a selector switch (14) with active positions and a neutral inactive position, each of such active positions connecting the arm of said selector switch through a plurality of directional lights (10 or 11) to a first terminal of said voltage source (12);

a differential amplifier (20);

a bridge circuit having the control electrodes of said differential amplifier (20) connected to the respective extremities (34,33) of a diagonal of said bridge, the arms of said bridge including a first (31) and a second (29) resistor connecting said extremities of said diagonal, respectively directly and through the winding (19) of a blink relay (16), with the second terminal of said voltage source (12) and including also a capacitor (32) and a third resistor (30) respectively connecting said extremities of said diagonal through other circuit elements with said first terminal of said voltage source (12);

a first semiconductor switching means (39) arranged to be switched on when one side (21) of said differential amplifier conducts and then to activate the winding (19) of said blink relay (16), said relay having contacts (15) connecting the arm of said selector switch (14) to said second terminal of said voltage source (12), and further arranged to switch the end of said first resistor (31) remote from said differential amplifier to alternate the direction of change of the charge of said capacitor (32) so as to make said differential amplifier operate as an astable multivibrator; and means (60,57) for modifying the discharge time of said capacitor (32) for at least one phase of the astable multivibrator cycle in response to a change in the amount of current that flows through said contacts of said relay when said relay is operated.

9. A blink pulse generator as defined in claim 8, in which said means for modifying the discharge time of said capacitor (32) comprises:

a voltage divider (58, 59) energized by said voltage source (12) having a first portion (58) interposed between said capacitor (32) and said first terminal of said source;

means, including a second semiconductor switch means (57), for shunting down said first portion of said voltage divider either steadily or else only during operation of said relay, according to whether current through a fourth resistor (17), interposed between said second terminal of said voltage source and said contacts (15) of said relay, exceeds a threshold value.

10. A blink pulse generator as defined in claim 9 in which said differential amplifier (20) is an emittercoupled differential amplifier and in which a third semiconductor switching means (91) is interposed between said first terminal of said voltage source and the emitter-coupling resistor (23) of said differential amplifier (20) and is controlled to open the emitter resistance connection and block both sides of said differential amplifier (20) when said selector switch (14) is in an open position.

11. A blink pulse generator as defined in claim 10 in which said third semiconductor switching means (91) is also interposed between said first terminal of said voltage source and said third resistor (30).

12. A blink pulse generator as defined in claim 11 in which a switching transistor (82) is connected to said capacitor (32) at its connection (34) with said diagonal of said bridge, for discharging said capacitor to the extent that the charge of said capacitor exceeds the voltage of said voltage source, and in which the base of said switching transistor (82) is connected to the output of said differential amplifier and its remaining electrode is connected to said first terminal of said voltage source (12).

13. A blink pulse generator as defined in claim 12 in which said differential amplifier is provided on a monolithic integrated circuit which contains also said switching transistor (82) for limiting the charge of said capacitor (32), and in which said switching transistor (82) is in the form as a parasitic substrate transistor associated with one of the transistors (24) of said differential amplifier (20).

14. A blink pulse generator as defined in claim 13 in which a leak resistor (56) is connected between the aforesaid one of the transistors (24) of said differential amplifier (20) and said first terminal of said voltage source (12).

15. A blink pulse generator as defined in claim 10 in which a second capacitor (83) is connected between the extremity (33) of said bridge diagonal to which said first capacitor (32) is not connected and said first terminal of said voltage source.

16. A blink pulse generator as defined in claim 15 in which said second capacitor (83) is connected to said first terminal of said voltage source (12) through the base of a transistor constituting said third semiconductor switching means (91) and also through a resistor (92) of low resistance interposed between the base of said transistor (91) and said second capacitor (83).

17. A blink pulse generator as defined in claim 10 in which the output of said differnntial amplifier (20) is connected for control of a coupling transistor (35), the output electrode of which is arranged to control, through an additional transistor (37), said first semiconductor means (39) which is constituted in the form of a Darlington transistor circuit.

18. A blink pulse generator as defined in claim 17 in which said additional transistor (37) is connected with a switching circuit (49, 51) serving to operate said third semiconductor switching means (91).

19. A blink pulse generator as defined in claim 8 in which a reverse peak by-pass diode (84) forming part of an integrated circuit is provided in parallel with said winding (19) of said blink relay (16).

20. A blink pulse generator as defined in claim 8 in which said means for modifying the discharge time of said capacitor (32), on the one hand, and on the other hand, said differential amplifier (20) and said semiconductor switching means (39) are supplied current from said second terminal of said voltage source over separate connections (50,55).

21. A blink pulse generator as defined in claim 19 in which a switching element (85, FIG. 2) is provided which is responsive to current through said reverse peak by-pass diode (84) for inhibiting the operation of said means (57) for modifying the discharge time of said capacitor (32).

22. a blink pulse generator as defined in claim 21 in which said reverse peak by-pass diode (84) is provided in the form of the base-emitter junction of a transistor (85) of which the collector-emitter path serves as said switching element.

23. A blink pulse generator as defined in claim 8 in which a third capacitor (90) is connected across said diagonal of said bridge for by-passing disturbances.

24. A blink pulse generator for directional lights of a motor vehicle comprising, in combination with a voltage source (12):

a selector switch (14) with two active positions and a neutral inactive position, each of such active positions connecting the arm of said selector switch through a plurality of directional lights (10 or 11) to a first terminal of said voltage source;

an emitter-coupled differential amplifier (20);

a bridge circuit having the control electrodes of said differential amplifier (20) connected to the respective extremities (34,33) of a diagonal of said bridge, the arms of said bridge including a first (31) and a second (29) resistor respectively connecting said extremities of said diagonal directly or indirectly with the second terminal of said voltage source (12) and including also a capacitor (32) and a third resistor (30) respectively connecting said extremities of said diagonal through the respective switched paths of a first (57) and a second (91) semiconductor switching means to a supply bus (43) connected to said first terminal of said voltage source (12);

a third semiconductor switching means (39) arranged to be switched on when one side (21) of said emitter-coupled differential amplifier (20) conducts and then to activate the winding (19) of a blink relay (16) having contacts (15) connecting the arm of said selector switch (14) through a fourth resistor (17) to said second terminal of said voltage source and also arranged to cause said differential amplifier (20) to operate as an astable multivibrator by operating when switched on to connect the end of said first resistor (31) remote from said differential amplifier to said supply bus (43) for discharge of said capacitor (32) and also to connect a fifth resistor (46) into effective parallelism with said third resistor (30) and also being arranged when not switched on to leave said fifth resistor (46) in parallel to said second resistor (29) while leaving said third resistor (30) effectively unshunted;

a voltage divider (58, 59) having one portion (58) thereof in parallel with the switched path of said first semiconductor switching means (57);

a fourth semiconductor switching means (60) for changing the state of said first semiconductor switching means (57) in response to the voltage drop across said fourth resistor (17) only when the current drawn through said contacts (15) of said relay exceeds a particular value of current; and means for operating said second semiconductor switching means (91) only when a circuit is completed from the arm of said selector switch to said first terminal of said voltage source, but not necessarily holding said second semiconductor switching means (91) operated during the opening time of said relay;

said emitter-coupled differential amplifier (20) being arranged with its common emitter resistor (23) connected to said first terminal of said source (12) through said second semiconductor switching means (91), so that both sides (21, 22) of said differential amplifier (20) are blocked when said second semiconductor switching means (91) is unoperated.

* * * * *